United States Patent
Sapp et al.

(10) Patent No.: US 8,194,955 B2
(45) Date of Patent: Jun. 5, 2012

(54) METHOD AND SYSTEM FOR DETECTION OF CONTRAST INJECTION IN FLUOROSCOPIC IMAGE SEQUENCES

(75) Inventors: Benjamin J. Sapp, Philadelphia, PA (US); Wei Zhang, Plainsboro, NJ (US); Bogdan Georgescu, Plainsboro, NJ (US); Simone Prummer, Neunkirchen am Brand (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 922 days.

(21) Appl. No.: 12/231,770

(22) Filed: Sep. 5, 2008

(65) Prior Publication Data
US 2009/0090873 A1 Apr. 9, 2009

Related U.S. Application Data

(60) Provisional application No. 60/974,100, filed on Sep. 21, 2007.

(51) Int. Cl.
*G06K 9/00* (2006.01)
(52) U.S. Cl. ........................................ 382/128
(58) Field of Classification Search ............... None
See application file for complete search history.

(56) References Cited

U.S. PATENT DOCUMENTS

| | | | |
|---|---|---|---|
| 4,977,587 A | 12/1990 | Honda | |
| 6,397,097 B1 | 5/2002 | Requardt | |
| 2004/0215081 A1 | 10/2004 | Crane et al. | |
| 2005/0228273 A1 | 10/2005 | Tamakoshi | |
| 2006/0173297 A1 | 8/2006 | Popescu | |
| 2006/0173360 A1 | 8/2006 | Kalafut et al. | |
| 2007/0058780 A1* | 3/2007 | Lienard et al. | 378/98.2 |
| 2008/0095421 A1* | 4/2008 | Sun et al. | 382/131 |
| 2009/0062641 A1* | 3/2009 | Barbu et al. | 600/424 |
| 2011/0064189 A1* | 3/2011 | Wang et al. | 378/42 |
| 2011/0221754 A1* | 9/2011 | Wang et al. | 345/440 |
| 2011/0228992 A1* | 9/2011 | Wels et al. | 382/128 |
| 2012/0070046 A1* | 3/2012 | Wu et al. | 382/128 |

* cited by examiner

*Primary Examiner* — Jermele M Hollington

(57) ABSTRACT

A method and system for detecting a spatial and temporal location of a contrast injection in a fluoroscopic image sequence is disclosed. Training volumes generated by stacking a sequence of 2D fluoroscopic images in time order are annotated with ground truth contrast injection points. A heart rate is globally estimated for each training volume, and local frequency and phase is estimated in a neighborhood of the ground truth contrast injection point for each training volume. Frequency and phase invariant features are extracted from each training volume based on the heart rate, local frequency and phase, and a detector is trained based on the training volumes and the features extracted for each training volume. The detector can be used to detect the spatial and temporal location of a contrast injection in a fluoroscopic image sequence.

20 Claims, 8 Drawing Sheets

FIG. 5
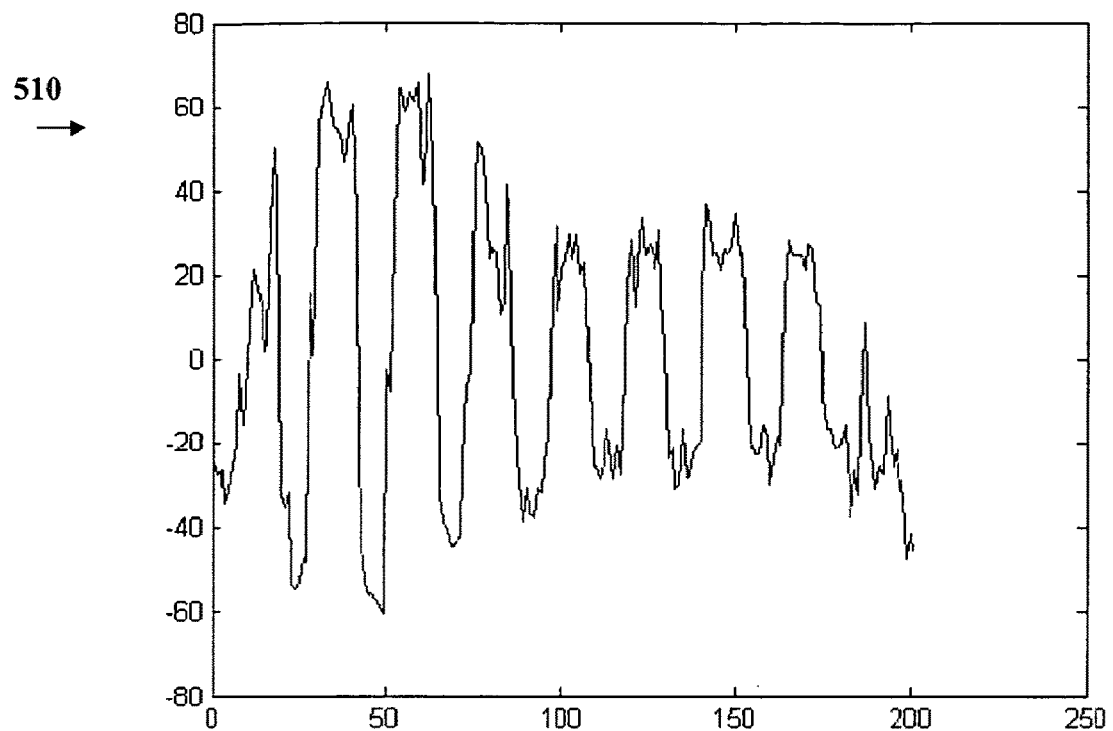
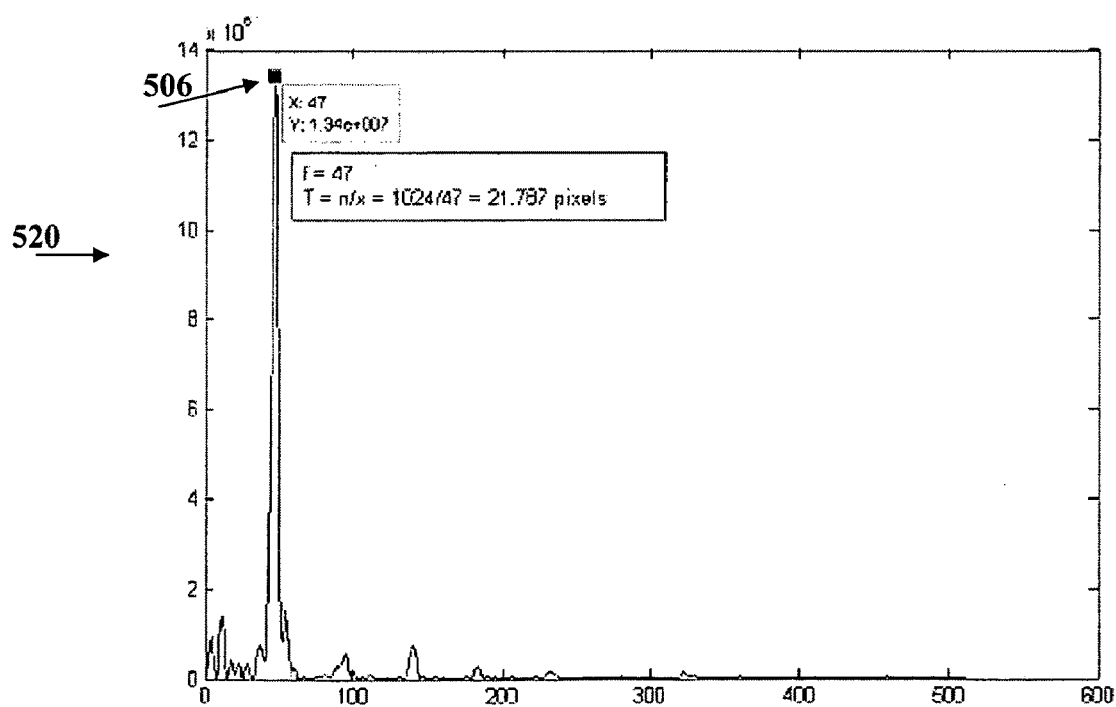

METHOD AND SYSTEM FOR DETECTION OF CONTRAST INJECTION IN FLUOROSCOPIC IMAGE SEQUENCES

This application claims the benefit of U.S. Provisional Application No. 60/974,100, filed Sep. 21, 2007, the disclosure of which is herein incorporated by reference.

BACKGROUND OF THE INVENTION

The present invention relates to detection of contrast injection in fluoroscopic image sequences, and more particularly to detection of where and when a contrast agent is injected in a fluoroscopic image sequence.

Coronary angiography is a procedure that is recommended preoperatively for patients who are suffering from or at risk for coronary artery disease. Angiography is a medical imaging technique in which X-ray images are used to visualize internal blood filled structures, such as arteries, veins, and the heart chambers. Since blood has the same radiodensity as the surrounding tissues, these blood filled structures cannot be differentiated from the surrounding tissue using conventional radiology. In angiography, a catheter is inserted into a blood vessel, typically in the groin or the arm. The catheter is guided and positioned either in the heart or in arteries near the heart, and a contrast agent is added to the blood via the catheter to make the blood vessels in the heart visible via X-ray. As the contrast agent travels down the branches of the coronary artery, the vessel branches become visible in the X-ray (fluoroscopic) image. The X-ray images are taken over a period of time, which results in a sequence of fluoroscopic images.

The moment when the contrast is injected provides important temporal information for the automatic analysis of vessels. This temporal information can be used to trigger the starting of automatic vessel detection. For example, this temporal information can be used in implementing Digital Subtraction Angiography (DSA), which detects vessels by subtracting a pre-contrast image or "mask image" from later fluoroscopic images once the contrast agent has been introduced. Furthermore, the spatial location of the contrast injection point can be used as a starting point for vessel detection and tracking. Accordingly, it is desirable to detect the time and location of a contrast injection in a fluoroscopic image sequence.

BRIEF SUMMARY OF THE INVENTION

The present invention provides a method and system for detecting the temporal and spatial location of a contrast injection in a sequence of fluoroscopic images. Embodiments of the present invention detect the contrast injection in a fluoroscopic image sequence as a 3-dimensional detection problem, with two spatial dimensions and one time dimension.

In one embodiment of the present invention, training volumes are received. Each training volumes is generated by stacking a sequence of 2D fluoroscopic images in time order and has two spatial dimensions and one temporal dimension. Each training volume is annotated with a ground truth contrast injection point. A heart rate is globally estimated for each training volume, and local frequency and phase is estimated in a neighborhood of the ground truth contrast injection point for each training volume. Frequency and phase invariant features are extracted from each training volume based on the heart rate, local frequency and phase. A detector, for detecting a spatial and temporal location of a contrast injection in a fluoroscopic image sequence, is trained based on the training volumes and the features extracted for each training volume. The detector can be trained using a probabilistic boosting tree (PBT).

In another embodiment of the present invention, a fluoroscopic image sequence is received, and a 3D volume is generated by stacking the fluoroscopic image sequence. The 3D volume has two spatial dimensions and one temporal dimension, and can be generated by stacking the 2D fluoroscopic images in time order and interpolating the stacked 2D fluoroscopic images to generate a continuous 3D volume. The spatial and temporal location of the contrast injection in the fluoroscopic image sequence is then detected by processing the 3D volume using a trained contrast injection detector. The trained contrast injection detector can be trained using a PBT based on training examples and frequency and phase invariant features extracted from the training examples.

These and other advantages of the invention will be apparent to those of ordinary skill in the art by reference to the following detailed description and the accompanying drawings.

BRIEF DESCRIPTION OF THE DRAWINGS

FIG. 5 illustrates an exemplary intensity profile and power spectrum;

DETAILED DESCRIPTION OF EXEMPLARY EMBODIMENTS

The present invention relates to detection of a contrast injection time and location in a fluoroscopic image sequence. Embodiments of the present invention are described herein to give a visual understanding of the contrast injection detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
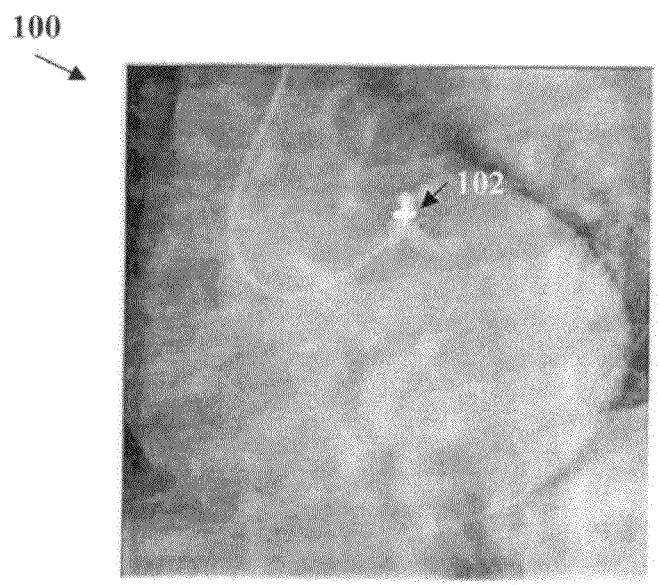
FIG. 1 illustrates an exemplary fluoroscopic image showing the start of a contrast injection.
Figure 2:
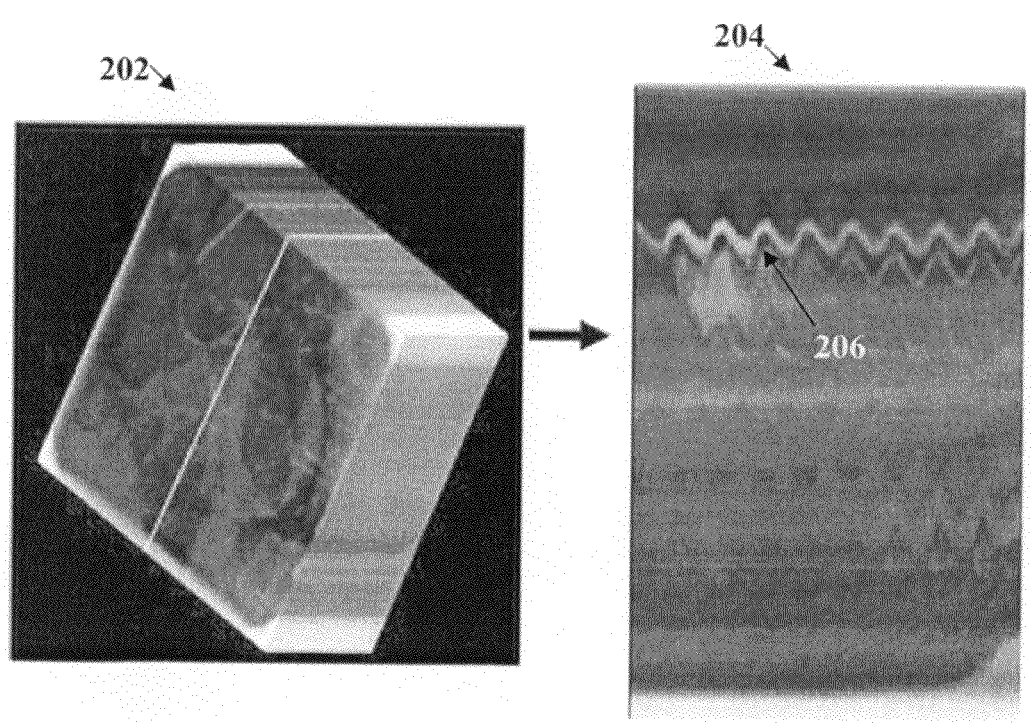
FIG. 2 illustrates an exemplary volume generated from a sequence of 2D fluoroscopic images.

A sequence of fluoroscopic images contains multiple 2D X-ray images obtained in real time. FIG. 1 illustrates an exemplary fluoroscopic image showing the start of a contrast injection. As illustrated in FIG. 1, image 100 is a fluoroscopic image with an annotated start location 102 of a contrast injection. A sequence of 2D fluoroscopic images can be stacked in order to generate a 3D volume with two spatial dimensions (x and y) and a time dimension (t). FIG. 2 illustrates an exemplary volume generated from a sequence of 2D fluoroscopic images. As illustrated in FIG. 2, image 202 is a 3D volume generated by stacking 2D fluoroscopic images in time order. Image 204 is a slice of volume 202 along a spatial-temporal plane, which shows the contrast in the blood vessels in the temporal domain. By the stacking a sequence of fluoroscopic images to generate a 3D volume, 3D volume detection can be used to determine a location in the volume for the contrast injection. The location in the volume gives both the spatial location (x, y) and the temporal location (t) of the contrast injection.

Embodiments of the present invention utilize the facts that vessel motion is mainly because of the heart beating and the heart beating is periodic. As shown in image 204 of FIG. 2, the contrast in the blood vessels in the temporal domain appears as a sinusoid wave 206, whereas the area without contrast on spatial-temporal slices will appear flat. Fourier transforms can be used to characterize the period motion that starts at the contrast injection point. Based on the periodic motion, the heart rate can be globally estimated from the time sequence angiogram, and the volume can be normalized with respect to the heart rate frequency to extract features that are invariant to patients' heart rates. Local phase and frequency estimation can also be performed to extract features invariant to local phase and frequency. The features can be used in training a detector to detect the location of the contrast injection in the volume.

Figure 3:
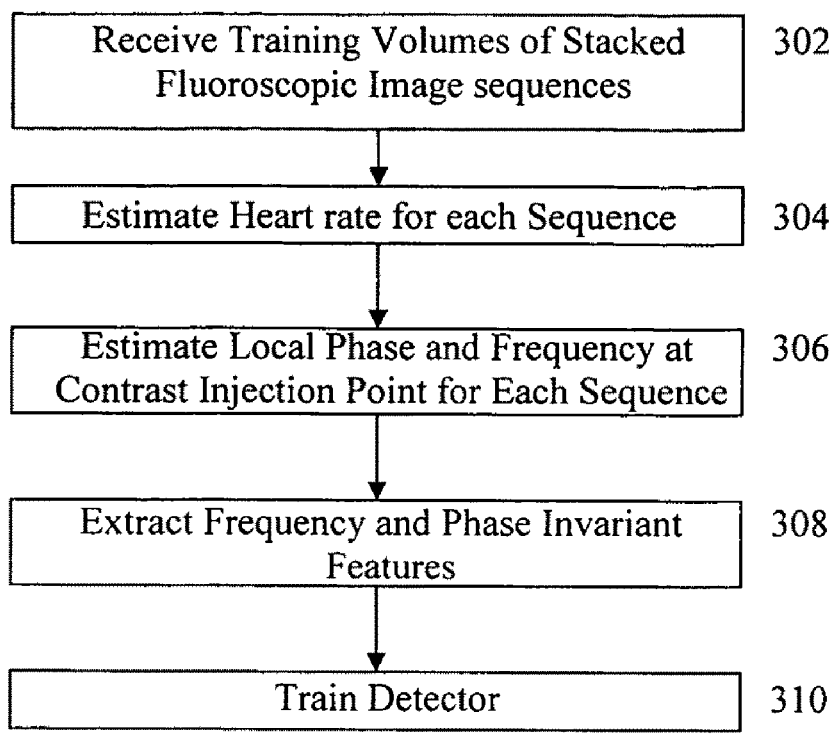
FIG. 3 illustrates a method of training a detector for detecting a spatial and temporal location of a contrast injection in a fluoroscopic image sequence according to an embodiment of the present invention.

FIG. 3 illustrates a method of training a detector for detecting a spatial and temporal location of a contrast injection in a fluoroscopic image sequence according to an embodiment of the present invention. At step 302, training volumes of stacked fluoroscopic image sequences are received. Each training volume is a series of 2D fluoroscopic images stacked in time order to form a 3D volume with two spatial dimensions (x, y) and a temporal dimension (t). The discrete frames of the fluoroscopic image sequence are stacked and interpolated based on the sampling rate of the sequence to generate a continuous 3D volume. Each training volume is annotated with the location (spatial and temporal) of a ground truth contrast injection point in the volume.

Figure 4:
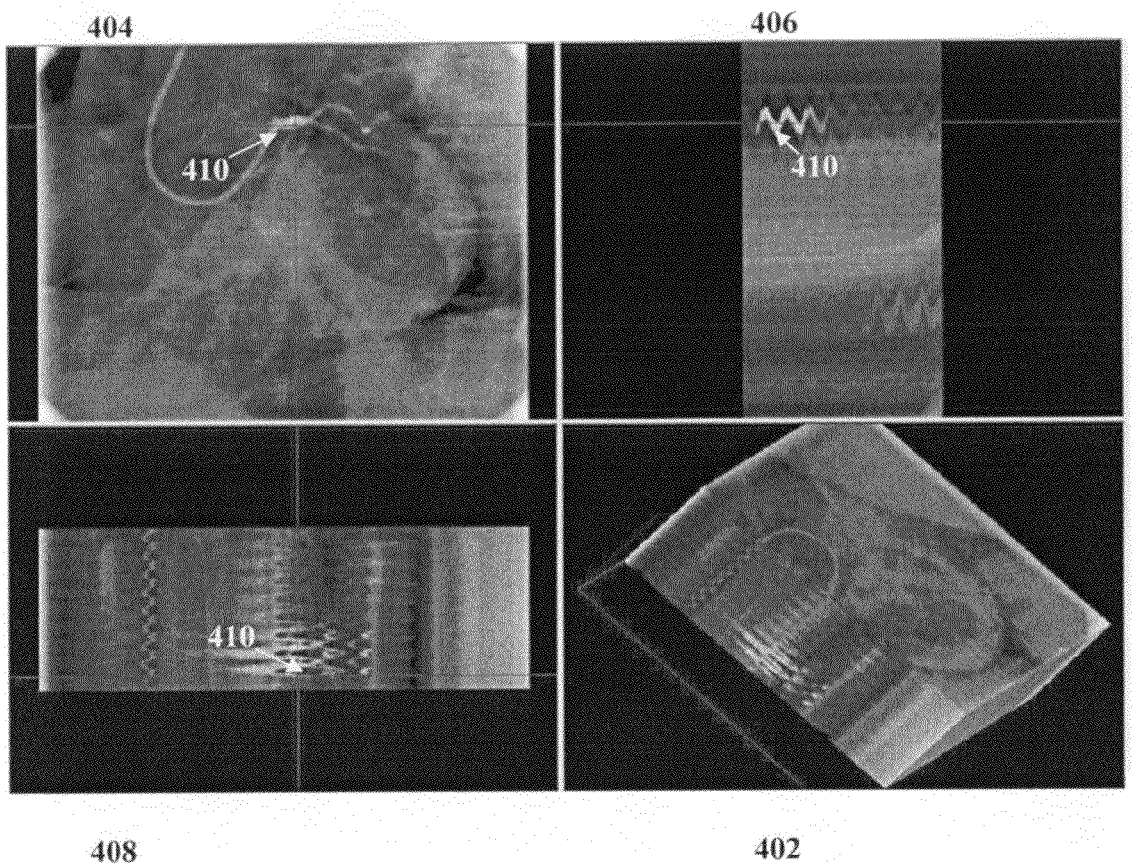
FIG. 4 illustrates an exemplary volume of stacked fluoroscopic images and slices of the volume.

FIG. 4 illustrates an exemplary volume of stacked fluoroscopic images and slices of the volume. As illustrated in FIG. 4, image 402 is a 3D volume of a stack fluoroscopic image sequence. Image 404 is a slice of volume 402 in the x-y plane. Image 404 is an original 3D fluoroscopic image of the sequence. Image 406 is a slice of volume 402 in the x-t plane, and image 408 is a slice of volume 402 in the y-t plane. The location 410 of the contrast injection is shown in images 404, 406, and 408. In image 404, the location 410 shows the spatial location, and in images 406 and 408 the location 410 shows the temporal location.

Returning to FIG. 3, at step 304, the heart rate is globally estimated for each sequence (training volume). The heart is estimated for a time sequence angiogram (fluoroscopic image sequence) via Fourier analysis. For each location (x, y) in the sequence, a 1D signal $s_{x,y}[t]=I(x,y,t)$ is the intensity value of that location at time t. The power spectrum $P_{x,y}$ of this signal is generated by taking the square of the magnitude of the Discrete Fourier transform (DFT): $P_{x,y}=S_n \cdot S^*_n$. Averaging the power spectrum over all locations gives a global average power spectrum, yielding main frequency components of the image sequence as peaks in the average power spectrum. The heart rate for the sequence can then be determined by limiting the range of frequencies to realistic heart rates to rule out other periodic signals (such as breathing). FIG. 5 illustrates an exemplary intensity profile and power spectrum. As illustrated in FIG. 5, graph 510 shows an intensity profile of a point with a fixed (x,y). The horizontal axis of graph 510 is time and the vertical axis of graph 510 is the intensity value with the mean subtracted. Graph 520 shows the power spectrum of the intensity profile of graph 510. The peak 506 in the power spectrum 520 corresponds to the frequency of the periodic motion in the volume. Since the periodic motion is due to the heart beating, the frequency of the periodic motion is the heart rate. The estimated period based on the power spectrum 520 is 21.787 pixels. This corresponds to the pixel distance between peaks in the volume. The strong peak in the power spectrum corresponds to 47 in the x axis, which means the frequency is 47.

Returning to FIG. 3, at step 306, local phase and frequency is estimated in a neighborhood of the ground truth contrast injection point for each sequence (training volume). The local phase and frequency are also estimated using Fourier analysis, but signal generation is different than in the global estimation of the frequency. For a given ground truth contrast point location (x,y), the local phase is determined in a neighborhood from (x,y−w/2) to (x,y+w/2), where w is the window size. To generate a 1D time varying signal, the location of the maximum intensity from each value from (x,y−w/2) to (x,y+w/2) is stored for each value of t. This should correspond to the location of the center of the vessel in a single frame, which is assumed to be brighter than its neighbors because of the contrast. This 1D signal is expressed $s_{x,y,w}[t]=\max\{I(x,j,t) | j>y-w/2 \text{ and } j<w/2\}$. $S_n$, the DFT of $s_{x,y,w}[t]$, is calculated, and the local frequency f is estimated as a local maximum in the power spectrum which lies in a reasonable range for heart rates. The phase is estimated as $\tan^{-1}(\text{imag}(S_n(f))/\text{real}(S_n(f)))$.

At step 308, frequency and phase invariant features are extracted from each sequence (training volume) using the estimated heart rate, local frequency, and phase. For classification of a candidate location (x,y,t) in a volume, a sub-window is aligned in time with the start of the estimated vessel period, such that the start of the sub-window is expressed as t_start=phase+floor((t−phase)/period)*period. Floor (x) is the largest integer which is not greater than x, and the period can be estimated as T=1024/f. The sub-window is extended in time for 2 periods to t_end=t_start+2*period. Thus, for a given amplitude a, the sub-window is from (x,y−a,t_start) to (x,y+a,t_end). For example, a can be fixed at 20 pixels.

Features are then defined relative to the sub-window and parameterized by a height and a shift as fractions of the amplitude and period. This provides invariance to differing phases and local frequencies in the same volume in different sub-windows, as well as different phases and frequencies (global heart rates and local frequencies) in different sequences. The height and shift can be discretized into 10 and 20 values, respectively. At each (height, shift) pair, features are generated based on intensity, gradient, difference in intensity one period ahead, and difference in intensity half a period ahead with inverted amplitude. At each value of shift, mean intensity features are generated for all heights (i.e., mean of the current column is the sub-window), and the difference in location of the maximum value in the previous and next shifts. Features are also generated that are global to the whole sub-window based on differences in intensity values in frames previous to the candidate location and in frames after the candidate location, as well as a feature based on the correlation between pixels for two consecutive heart beat periods. This means that more features are generated around the candidate location.

Figure 6:
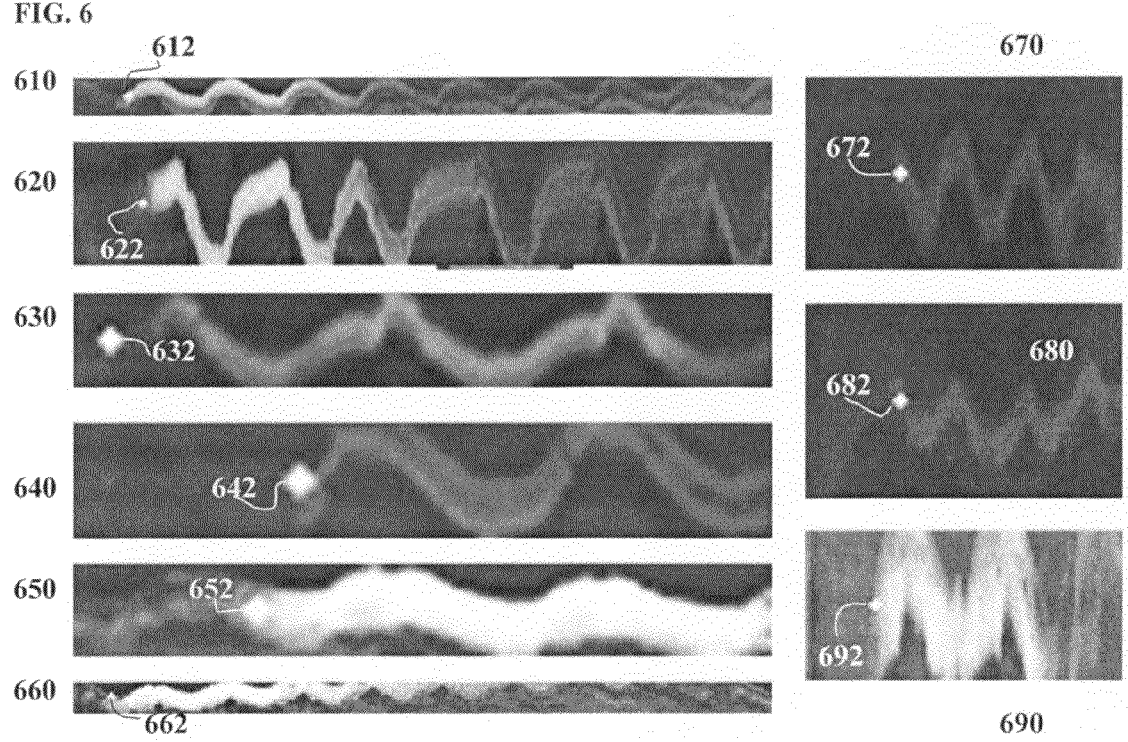
FIG. 6 illustrates exemplary positive training examples.
Figure 7:
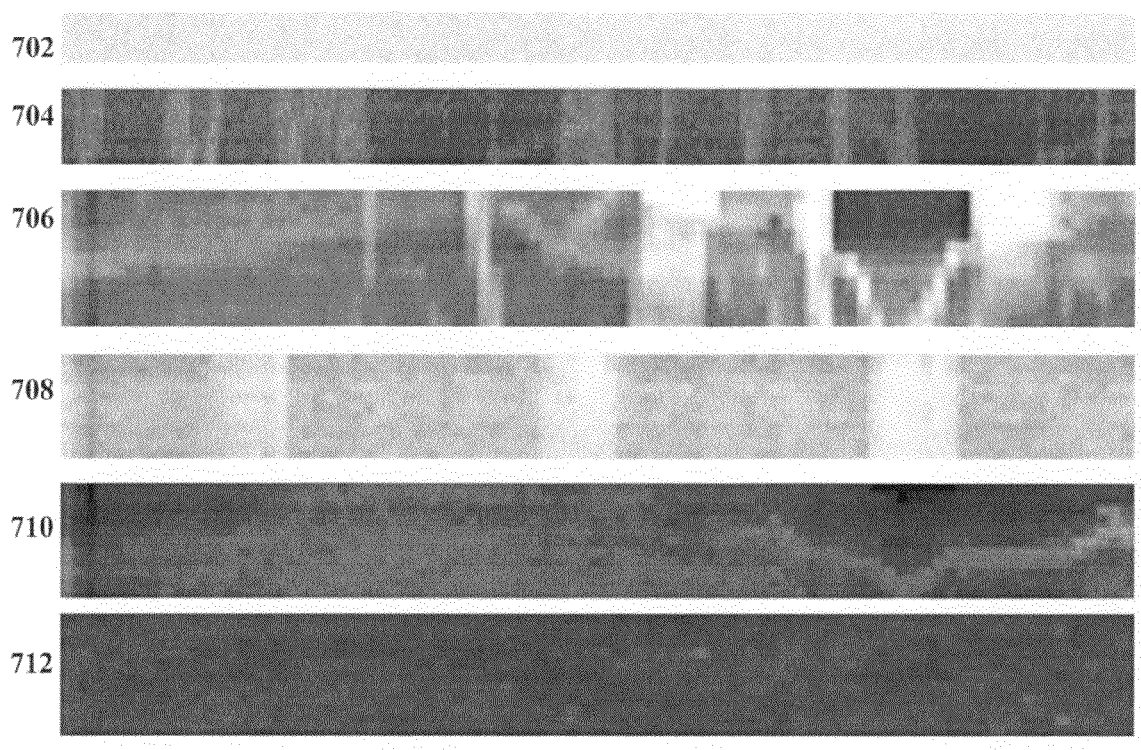
FIG. 7 illustrates exemplary negative training examples.

At step 310, a detector is trained based on the training volumes and the features extracted from the training volumes. As described above, each of the training volumes is annotated with the location of a ground truth contrast injection point. These ground truth locations are used as positive training examples, and other locations in the volumes are used as negative training examples. FIG. 6 illustrates exemplary positive training examples. As illustrated in FIG. 6, images 610, 620, 630, 640, 650, 660, 670, 680, and 690 are partial slices of training volumes and are annotated with ground truth contrast injection locations 612, 622, 632, 642, 652, 662, 672, 682, and 692, respectively. FIG. 7 illustrates exemplary negative training examples. As illustrated in FIG. 7, images 702, 704, 706, 708, 710, and 712 are partial slices of training volumes with no contrast injection points. The detector can be trained based on the positive and negative training examples using a probabilistic boosting tree (PBT) with the extracted features. A PBT detector is trained by recursively constructing a tree, where each of the nodes represents a strong classifier. Once the strong classifier of each node is trained, the input training data for the node is classified into two sets (positives and negatives) using the learned strong classifier. The two new sets are fed to left and right child nodes respectively to train the left and right child nodes. In this way, the PBT classifier is constructed recursively.

Figure 8:
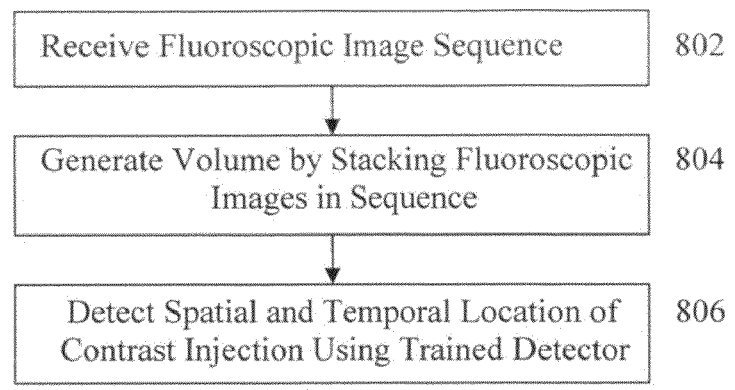
FIG. 8 illustrates a method for detecting a spatial and temporal location of contrast injection in a fluoroscopic image sequence using a trained detector according to an embodiment of the present invention.

Once a detector is trained based on the training volumes and the extracted features, the detector can be used to detect the spatial and temporal location of a contrast injection in fluoroscopic image sequences. FIG. 8 illustrates a method for detecting a spatial and temporal location of contrast injection in a fluoroscopic image sequence using a trained detector according to an embodiment of the present invention. At step 802, a fluoroscopic image sequence is received. The fluoroscopic image can be received directly from an X-ray imaging device or can be loaded, for example from a memory or storage of a computer system, or some other computer readable medium.

At step 804, a 3D volume is generated from the fluoroscopic image sequence by stacking the 2D fluoroscopic images in the sequence. The fluoroscopic images are stacked in time order, and the discrete images are interpolated based on a sampling rate to generate a continuous 3D volume.

At step 806, the trained detector is used to detect the spatial and temporal location of the contrast injection point in the fluoroscopic image sequence. The detector is trained using the method of FIG. 3. The trained detector searches the volume to detect a contrast injection point (x,y,t) in the volume. The detector determines probabilities for candidate points in the volume to determine the point with the highest probability of being a contrast injection point. The contrast injection point (x,y,t) gives the spatial location (x,y) of the contrast injection and the temporal location (t) of the contrast injection.

Figure 9:
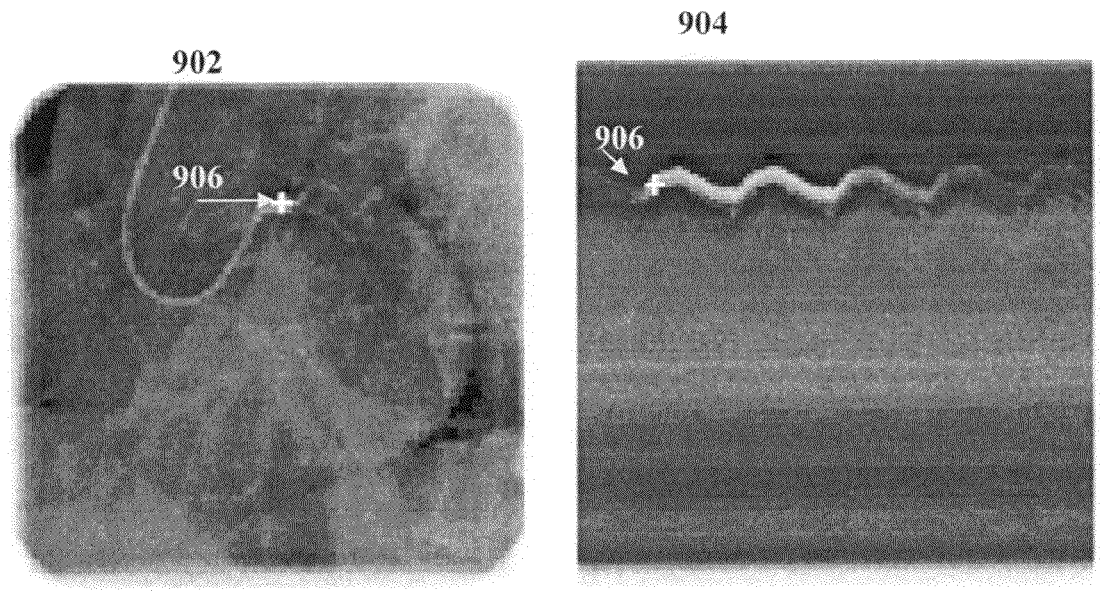
FIG. 9 illustrates exemplary contrast injection detection results.

FIG. 9 illustrates exemplary contrast injection detection results. The detection results of FIG. 9 were detected, as described in the method of FIG. 8, with a detector trained using the method of FIG. 3. As illustrated in FIG. 9, image 902 shows a detected contrast injection point 906 in the spatial domain and image 904 shows the detected contrast injection point 906 in the temporal domain. Accordingly, the location of the contrast injection point 906 in image 902 is the spatial location is the spatial location of the contrast injection, and the location of the contrast injection point 906 in image 904 is the temporal location of the contrast injection.

The spatial and temporal location of a contrast injection point can be used in automated image processing methods, such as vessel extraction or segmentation methods. For example, automated vessel segmentation methods, such as coronary digital subtraction angiography (DSA), may return erroneous results when trying to segment images in a fluoroscopic image sequence prior to the contrast injection. Such automated vessel segmentation methods can restrict segmentation to after the detected contrast injection point in a fluoroscopic image sequence. The spatial and temporal location of the contrast injection point can also be used in coronary DSA to determine a pre-contrast image, as well as for virtual contrast to determine the model cycle.

Figure 10:
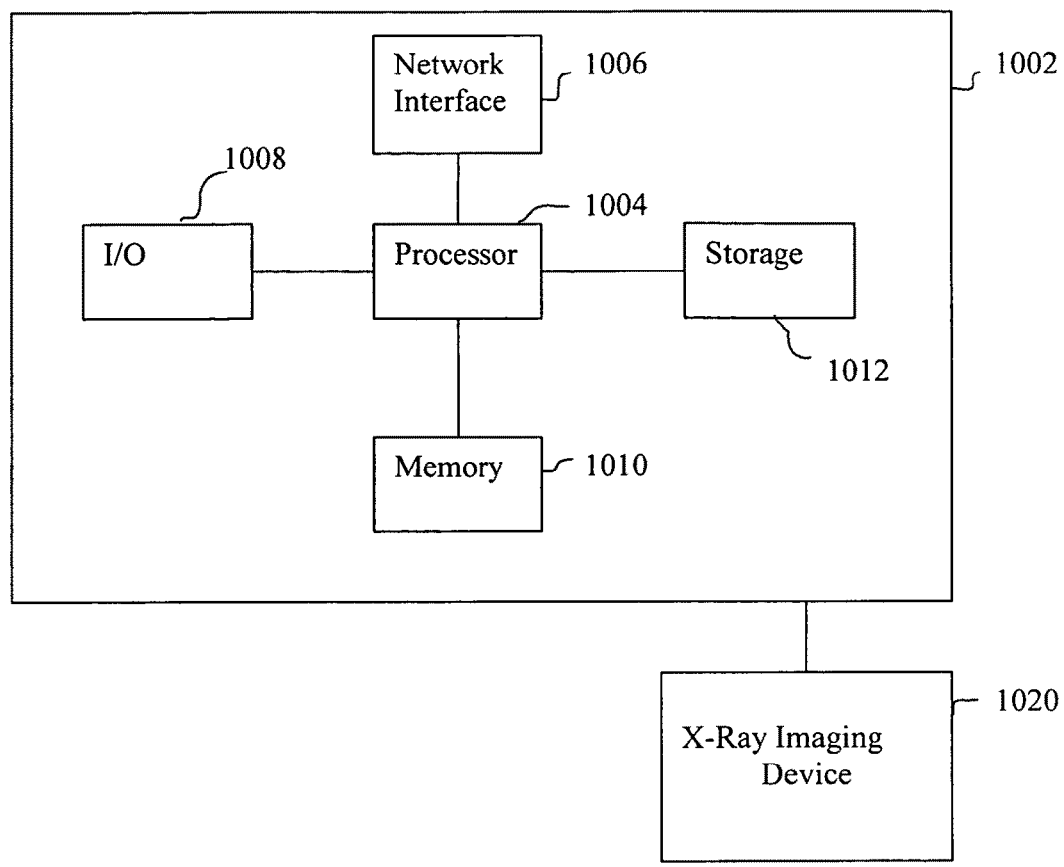
FIG. 10 is a high level block diagram of a computer capable of implementing the present invention.

The above-described methods for contrast injection detection can be implemented on a computer using well-known computer processors, memory units, storage devices, computer software, and other components. A high-level block diagram of such a computer is illustrated in FIG. 10. Computer 1002 contains a processor 1004 which controls the overall operation of the computer 1002 by executing computer program instructions which define such operation. The computer program instructions may be stored in a storage device 1012, or other computer readable medium (e.g., magnetic disk, CD ROM, etc.), and loaded into memory 1010 when execution of the computer program instructions is desired. Thus, the method steps of FIGS. 3 and 8 can be defined by the computer program instructions stored in the memory 1010 and/or storage 1012 and controlled by the processor 1004 executing the computer program instructions. An X-ray imaging device 1020 can be connected to the computer 1002 to input X-ray images to the computer 1002. It is possible to implement the X-ray imaging device 1020 and the computer 1002 as one device. It is also possible that the X-ray imaging device 1020 and the computer 1002 communicate wirelessly through a network. The computer 1002 also includes one or more network interfaces 1006 for communicating with other devices via a network. The computer 1002 also includes input/output devices 1008 that enable user interaction with the computer 1002 (e.g., display, keyboard, mouse, speakers, buttons, etc.) One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of training a detector for detecting spatial and temporal locations of a contrast injection in fluoroscopic image sequences, comprising:
receiving a plurality of training volumes, each training volume formed by stacking a sequence of 2D fluoroscopic images, and each training volume annotated with a ground truth contrast injection location;
estimating a heart rate for each training volume;

estimating local frequency and phase in a neighborhood of the ground truth contrast injection location for each training volume;

extracting features from each training volume that are frequency and phase invariant based on the estimated heart rate and the estimated local frequency and phase; and training a detector for detecting spatial and temporal locations of a contrast injection in fluoroscopic image sequences based on the training volumes and the extracted features for the training volumes.

2. The method of claim 1, further comprising:

receiving a fluoroscopic image sequence;

detecting a spatial and temporal location of a contrast injection location in the fluoroscopic image sequence using the trained detector.

3. The method of claim 1, wherein said step of estimating a heart for each volume comprises:

determining an intensity profile for each spatial location in the sequence of 2D fluoroscopic images with respect to time;

calculating a power spectrum of each intensity profile;

averaging the power spectrum over all spatial locations in the sequence of 2D fluoroscopic images to generate an average power spectrum;

determining the heart rate based on a peak of the average power spectrum within a frequency range of realistic hearts rates.

4. The method of claim 1, wherein said step of estimating local frequency and phase in a neighborhood of the ground truth contrast injection location for each training volume comprises:

determining an intensity profile of a brightest point in the neighborhood of the ground truth contrast injection location;

calculating a power spectrum of the intensity profile;

determining the local frequency and phase based on the power spectrum.

5. The method of claim 4, wherein the local frequency is a local maximum in the power spectrum.

6. The method of claim 1, wherein said step of extracting features from each training volume that are frequency and phase invariant comprises:

defining a sub-window for candidate spatial and temporal locations in each training volume using an amplitude and a period based on the estimated heart rate, local frequency and phase; and extracting features for each sub-window that are parameterized by a height and a shift as fractions of the amplitude and the period, respectively.

7. The method of claim 6, wherein said step of extracting features for each sub-window that are parameterized by a height and a shift as fractions of the amplitude and the period, respectively, comprises:

at each height shift pair, extracting features based on intensity, gradient, difference in intensity one period ahead, and difference in intensity a half a period ahead with inverted amplitude;

at each shift, extracting mean intensity features for all heights and a difference in location of a maximum value in previous and next shifts; and extracting features global to the sub-window based on differences in intensity values in frames previous to and subsequent to the candidate spatial and temporal location, and a correlation between pixels between two periods.

8. The method of claim 1, wherein said step of training a detector for detecting spatial and temporal locations of a contrast injection in fluoroscopic image sequences based on the training volumes and the extracted features for the training volumes comprises:

training the detector using a probabilistic boosting tree (PBT).

9. The method of claim 1, wherein each of the training volumes is a 3D volume having two spatial dimensions and one temporal dimension.

10. An apparatus for training a detector for detecting spatial and temporal locations of a contrast injection in fluoroscopic image sequences, comprising:

means for receiving a plurality of training volumes, each training volume formed by stacking a sequence of 2D fluoroscopic images, and each training volume annotated with a ground truth contrast injection location;

means for estimating a heart rate for each training volume;

means for estimating local frequency and phase in a neighborhood of the ground truth contrast injection location for each training volume;

means for extracting features from each training volume that are frequency and phase invariant based on the estimated heart rate and the estimated local frequency and phase; and means for training a detector for detecting spatial and temporal locations of a contrast injection in fluoroscopic image sequences based on the training volumes and the extracted features for the training volumes.

11. The apparatus of claim 10, further comprising:

means for receiving a fluoroscopic image sequence;

means for detecting a spatial and temporal location of a contrast injection location in the fluoroscopic image sequence using the trained detector.

12. The apparatus of claim 10, wherein said means for estimating a heart for each volume comprises:

means for determining an intensity profile for each spatial location in the sequence of 2D fluoroscopic images with respect to time;

means for calculating a power spectrum of each intensity profile;

means for averaging the power spectrum over all spatial locations in the sequence of 2D fluoroscopic images to generate an average power spectrum;

means for determining the heart rate based on a peak of the average power spectrum within a frequency range of realistic hearts rates.

13. The apparatus of claim 10, wherein said means for estimating local frequency and phase in a neighborhood of the ground truth contrast injection location for each training volume comprises:

means for determining an intensity profile of a brightest point in the neighborhood of the ground truth contrast injection location;

means for calculating a power spectrum of the intensity profile;

means for determining the local frequency and phase based on the power spectrum.

14. The apparatus of claim 10, wherein said means for extracting features from each training volume that are frequency and phase invariant comprises:

means for defining a sub-window for candidate spatial and temporal locations in each training volume using an amplitude and a period based on the estimated heart rate, local frequency and phase; and means for extracting features for each sub-window that are parameterized by a height and a shift as fractions of the amplitude and the period, respectively.

15. The apparatus of claim 10, wherein said means for training a detector for detecting spatial and temporal locations of a contrast injection in fluoroscopic image sequences based on the training volumes and the extracted features for the training volumes comprises:

means for training the detector using a probabilistic boosting tree (PBT).

16. A non-transitory computer readable medium encoded with computer executable instructions for training a detector for detecting spatial and temporal locations of a contrast injection in fluoroscopic image sequences, the computer executable instructions defining steps comprising:

receiving a plurality of training volumes, each training volume formed by stacking a sequence of 2D fluoroscopic images, and each training volume annotated with a ground truth contrast injection location;

estimating a heart rate for each training volume;

estimating local frequency and phase in a neighborhood of the ground truth contrast injection location for each training volume;

extracting features from each training volume that are frequency and phase invariant based on the estimated heart rate and the estimated local frequency and phase; and training a detector for detecting spatial and temporal locations of a contrast injection in fluoroscopic image sequences based on the training volumes and the extracted features for the training volumes.

17. The non-transitory computer readable medium of claim 16, wherein the computer program instructions defining the step of estimating a heart for each volume comprise computer executable instructions defining the step of:

determining an intensity profile for each spatial location in the sequence of 2D fluoroscopic images with respect to time;

calculating a power spectrum of each intensity profile;

averaging the power spectrum over all spatial locations in the sequence of 2D fluoroscopic images to generate an average power spectrum;

determining the heart rate based on a peak of the average power spectrum within a frequency range of realistic hearts rates.

18. The non-transitory computer readable medium of claim 16, wherein the computer executable instructions defining the step of estimating local frequency and phase in a neighborhood of the ground truth contrast injection location for each training volume comprise computer executable instructions defining the steps of:

determining an intensity profile of a brightest point in the neighborhood of the ground truth contrast injection location;

calculating a power spectrum of the intensity profile;

determining the local frequency and phase based on the power spectrum.

19. The non-transitory computer readable medium of claim 16, wherein the computer executable instructions defining the step of extracting features from each training volume that are frequency and phase invariant comprise computer executable instructions defining the steps of:

defining a sub-window for candidate spatial and temporal locations in each training volume using an amplitude and a period based on the estimated heart rate, local frequency and phase; and extracting features for each sub-window that are parameterized by a height and a shift as fractions of the amplitude and the period, respectively.

20. The non-transitory computer readable medium of claim 16, wherein the computer readable instructions defining the step of training a detector for detecting spatial and temporal locations of a contrast injection in fluoroscopic image sequences based on the training volumes and the extracted features for the training volumes comprise computer readable instructions defining the step of:

training the detector using a probabilistic boosting tree (PBT).

\* \* \* \* \*